(12) United States Patent
Kim et al.

(10) Patent No.: US 11,183,025 B2
(45) Date of Patent: Nov. 23, 2021

(54) METHOD AND SYSTEM FOR HOLDING CLUB-COMPETITION WEB BOARD GAME CONTEST

(71) Applicants: Beoung Cheon Kim, Seongnam-si (KR); Bae Rim Kim, Seoul (KR)

(72) Inventors: Beoung Cheon Kim, Seongnam-si (KR); Bae Rim Kim, Seoul (KR)

( * ) Notice: Subject to any disclaimer, the term of this patent is extended or adjusted under 35 U.S.C. 154(b) by 30 days.

(21) Appl. No.: 16/646,200

(22) PCT Filed: Aug. 30, 2018

(86) PCT No.: PCT/KR2018/010050
§ 371 (c)(1),
(2) Date: Mar. 11, 2020

(87) PCT Pub. No.: WO2019/054670
PCT Pub. Date: Mar. 21, 2019

(65) Prior Publication Data
US 2020/0273296 A1    Aug. 27, 2020

(30) Foreign Application Priority Data
Sep. 13, 2017 (KR) .................. 10-2017-0116962

(51) Int. Cl.
*G07F 17/32* (2006.01)
(52) U.S. Cl.
CPC ........ *G07F 17/3276* (2013.01); *G07F 17/323* (2013.01); *G07F 17/3223* (2013.01)

(58) Field of Classification Search
None
See application file for complete search history.

(56) References Cited

U.S. PATENT DOCUMENTS

| | | | | |
|---|---|---|---|---|
| 9,607,479 | B2* | 3/2017 | Robbins | G07F 17/3244 |
| 2005/0288803 | A1* | 12/2005 | Ropp | G07F 17/3276 |
| | | | | 700/91 |
| 2006/0241795 | A1* | 10/2006 | Weingardt | G07F 17/32 |
| | | | | 700/91 |
| 2007/0191109 | A1* | 8/2007 | Crowder | G07F 17/32 |
| | | | | 463/42 |
| 2009/0069092 | A1* | 3/2009 | Kelly | G07F 17/3209 |
| | | | | 463/42 |
| 2009/0069093 | A1* | 3/2009 | Kelly | G07F 17/3209 |
| | | | | 463/42 |
| 2015/0072773 | A1* | 3/2015 | Arnone | G07F 17/3272 |
| | | | | 463/25 |

(Continued)

FOREIGN PATENT DOCUMENTS

| | | |
|---|---|---|
| KR | 10-2008-0039867 A | 5/2008 |
| KR | 10-2008-0080657 A | 9/2008 |
| KR | 10-2012-0077834 A | 7/2012 |

(Continued)

*Primary Examiner* — Sunit Pandya
(74) *Attorney, Agent, or Firm* — KORUS Patent, LLC; Seong Il Jeong

(57) ABSTRACT

A method and a system for hosting a club-competition web board game contest are provided wherein, in connection with a web board game such as go-stop, poker, or mahjong, a company becomes a game club owner, users become players affiliated to game clubs, and players affiliated to different game clubs can enjoy game contests in league and tournament types.

39 Claims, 19 Drawing Sheets

(56) References Cited

U.S. PATENT DOCUMENTS

2015/0209679 A1* 7/2015 Givant .................. A63F 13/792
 463/25
2017/0106290 A1* 4/2017 Pierce .................. A63F 13/792

FOREIGN PATENT DOCUMENTS

KR 10-2013-0137988 A 12/2013
KR 10-2014-0120229 A 10/2014

* cited by examiner

| Member Classification | Affiliation | Participating Contest | Affiliation Changing Timing |
|---|---|---|---|
| Male members 39 years old and under | Youth Men's Club | Youth Men's Club Contest | January 1 every year |
| Female members 39 years old and under | Youth Women's Club | Youth Women's Club Contest | January 1 every year |
| Male members 40~59 years old | Middle-aged Men's Club | Middle-aged Men's Club Contest | January 1 every year |
| Female members 40~59 years old | Middle-aged Men's Club | Middle-aged Men's Club Contest | January 1 every year |
| Male members 60 years old and over | Senior Men's Club | Senior Men's Club Contest | January 1 every year |
| Male members 60 years old and over | Senior Women's Club | Senior Women's Club Contest | January 1 every year |

FIG. 6

| Tournament Games Tournament Title | Ordinary Qualifier Contest | Ordinary After Qualifier Contest | Regional Contest | Overall Contest |
|---|---|---|---|---|
| Youth Men's Club: Men 39 years old and under | Contest Server | Contest Server | Contest Server | Contest Server |
| Youth Women's Club: Women 39 years old and under | Contest Server | Contest Server | Contest Server | Contest Server |
| Middle-aged Men's Club Men 40-59 years old | Contest Server | Contest Server | Contest Server | Contest Server |
| Middle-aged Women's Club: Women 40-59 years old | Contest Server | Contest Server | Contest Server | Contest Server |
| Senior Men's Club: Men 60 years old | Contest Server | Contest Server | | Contest Server |
| Senior Women's Club: Women 60 years old | Contest Server | Contest Server | Contest Server | Contest Server |

FIG. 7

Go-stop League Contest Prize Money / Common to All Clubs

| Go-stop League Contest Ranking | Number of Prize Winners | Contest Prize Money | Allocated Prize Money (100% Total) |
|---|---|---|---|
| 1st place | 1 person | Corresponding amount | 25% |
| 2nd place | 1 person | Corresponding amount | 15% |
| 3rd place | 1 person | Corresponding amount | 10% |
| 4th to 10th place | 7 people | Corresponding amount | 30% |
| 11th to 20th place | 10 people | Corresponding amount | 20% |

Go-stop Tournament Contest Prize Money / Common to 6 Tournament Parts

| Go-stop Tournament Contest Ranking | Number of Prize Winners | Contest Prize Money | Allocated Prize Money (100% Total) |
|---|---|---|---|
| Champion | 1 person | Corresponding amount | 35% |
| 2nd place | 1 person | Corresponding amount | 15% |
| 3rd place | 1 person | Corresponding amount | 7% |
| Joint 4th place | 6 people | Corresponding amount | 18% |
| Joint 5th place | 18 people | Corresponding amount | 25% |

FIG. 17

{ Mahjong League Contest Prize Money / Common to All Clubs }

| Mahjong League Contest 1st Rank | Number of Prize Winners | Content Prize Money | Allocated Prize Money Per Rank |
|---|---|---|---|
| 1st place | 1 person | Corresponding amount | 25% |
| 2nd place | 1 person | Corresponding amount | 15% |
| 3rd place | 1 person | Corresponding amount | 10% |
| 4th to 10th place | 7 people | Corresponding amount | 30% |
| 11th to 20th place | 10 people | Corresponding amount | 20% |

{ Mahjong Tournament Contest Prize Money / Common to 6 Tournament Parts }

| Mahjong Tournament Contest Rank | Number of Prize Winners | Content Prize Money | Allocated Prize Money Per Rank |
|---|---|---|---|
| Champion | 1 person | Corresponding amount | 30% |
| 2nd place | 1 person | Corresponding amount | 20% |
| 3rd place | 1 person | Corresponding amount | 15% |
| 4th place | 1 person | Corresponding amount | 10% |
| Joint 5th place | 12 people | Corresponding amount | 25% |

FIG. 18

{ 7 Poker League Contest Prize Money / Common to All Clubs }

| Poker League Contest Ranking | Number of Prize Winners | Contest Prize Money | Allocation of Prize Money (100 Total) |
|---|---|---|---|
| 1st place | 1 person | Corresponding amount | 25% |
| 2nd place | 1 person | Corresponding amount | 15% |
| 3rd place | 1 person | Corresponding amount | 10% |
| 4th to 10th place | 7 people | Corresponding amount | 30% |
| 11th to 20th place | 10 people | Corresponding amount | 20% |

{ 7 Poker Tournament Contest Prize Money / Common to 6 Tournament Parts }

| Poker Tournament Contest Ranking | Number of Prize Winners | Contest Prize Money | Allocation of Prize Money (100 Total) |
|---|---|---|---|
| Champion | 1 person | Corresponding amount | 25% |
| 2nd place | 1 person | Corresponding amount | 15% |
| 3rd place | 1 person | Corresponding amount | 10% |
| 4th place | 1 person | Corresponding amount | 7% |
| 5th place | 1 person | Corresponding amount | 5% |
| Joint 6th place | 20 people | Corresponding amount | 38% |

FIG. 19

| Game Account of Strong man | | | | |
|---|---|---|---|---|
| | Rookie | Intermediate | Expert | |
| Affiliated in Youth Men's Club | - | | | Joined on 2018.08.21 |
| # of Contests Participated | 2 times | 35 times | 77 times | |
| Winning Points | 2 points | 10 points | 7 points | |
| Penalty Points | 2 points | 7 points | 20 points | |
| Scoring | 500,000 points | 5,500,000 | 7,500,000 | |
| Game Usage Time | 12mins. 52secs. | 120mins. 11secs. | 420mins. 15secs. | |
| # of Times Scoring 800,000 Points or More | | 1 time | 10 times | |
| # of Times Scoring 700,000~690,000 Points | | 2 times | 2 times | |
| # of Times Scoring 600,000~490,000 Points | | 3 times | 3 times | |
| # of Times Scoring 500,000~390,000 Points | | 2 times | 4 times | |
| # of Times Scoring 400,000~490,000 Points | | 4 times | 5 times | |
| # of Times Scoring 300,000~390,000 Points | 1 time | 10 times | 5 times | |
| # of Times Scoring 200,000~290,000 Points | - | 7 times | 7 times | |
| # of Times Scoring 100,000~190,000 Points | 1 time | 15 times | 10 times | |
| # of Times Scoring 90,000 Points or Less | - | 22 times | 15 times | |
| Club Ranking | 2500th place | 120th place | 102nd place | |
| Total Ranking | 3200th place | 222nd place | 180th place | |
| Tournaments Participated | - | - | Participated | |
| Contest Prize Won | - | - | - | |
| Full Membership Joined | VIP member | VIP member | VIP member | Terminates on 2019.09.30 |
| Clubs Moved | | 7 times | 10 times | |

FIG. 20

| | High Scores | Other Scores | Getting Zero Points / Getting Extra Points | Bonus Points / Getting Extra Points |
|---|---|---|---|---|
| 2-Player Go-stop Game Contest | 2 | | -1 | -2 |
| 3-Player Go-stop Game Contest | 3 | 1 | -1 | -3 |
| 4-Player Mahjong Game Contest | 4 | 1 | -1 | -4 |
| 5-Player Poker Game Contest | 5 | 1 | -1 | -5 |

FIG. 21

| | Quality Touch Points | Tool Basketball | Fight | Fight Gambling God Poker | User Enter God Poker | Senior Poker |
|---|---|---|---|---|---|---|---|
| Exceed Time | 1 point | Over 8secs. | Over10secs. | Over10secs. | Over 12 secs. | Over12secs. | Over 14 secs. |
| Disconnection | 2 points | 2 points | 2 points | 2 points | 2 points | 2 points | 2 points |
| Forfeit Contest | 5 points | 5 points | 5 points | 5 points | 5 points | 5 points | 5 points |

FIG. 22

| 1st Content | 1st Content | 2nd Content | 3rd Content | Daily Ave. Watch Time | Total Watch Time |
|---|---|---|---|---|---|
| Day 1 | 5mins. 27secs. | 4mins. 57secs. | 6mins. 11secs. | 16mins. 35secs. | 16mins. 35secs. |
| Day 2 | 8mins. 27secs. | 9mins. 20secs. | X | 17mins. 47secs. | 34mins. 22secs. |
| Day 3 | 6mins. 21secs. | 8mins. 14secs. | 9mins. 50secs. | 24mins. 25secs. | 58mins. 47secs. |
| Day 31 | | | | | 522mins. 33secs. |

FIG. 23

| 1st Element | 1st Content Saved Points | 2nd Content Saved Points | 3rd Content Saved Points | Daily Ave. Saved Points | Total Saved Points |
|---|---|---|---|---|---|
| Day 1 | 1,200,000 | 700,000 | -900,000 | 1,000,000 | 1,000,000 |
| Day 2 | 600,000 | -800,000 | x | -200,000 | 800,000 |
| Day 3 | -800,000 | -700,000 | 300,000 | -1,200,000 | -400,000 |
| Day 4 | 330,000 | 240,000 | 1,600,000 | 2,170,000 | 1,770,000 |
| Day 5 | 500,000 | -800,000 | 330,000 | 30,000 | 1,800,000 |
| Day 31 | | | | | 7,780,000 |

FIG. 24

| Tournament type | Entry fee for each individual | Initial points | Rounds per round | Max play time for each round | Response time in each round | Penalty for exceeding max play time |
|---|---|---|---|---|---|---|
| 2-Player Go-stop Game Contest | 2 million points | 10thousand | 10rounds | 6 mins. | 8 secs. | When exceeded, 1penalty point |
| 3-Player Go-stop Game Contest | 2 million points | 10thousand | 10rounds | 5 mins. | 8 secs. | When exceeded, 1penalty point |
| 4-Player Mahjong Game Contest | 3 million points | 10thousand | 10rounds | 4 mins. | 8 secs. | When exceeded, 1penalty point |
| 5-Player Poker Game Contest | 5 million points | Ante 10thousand | 10rounds | 3 mins. | 8 secs. | When exceeded, 1penalty point |

FIG. 25

| Tournament type | Entry fee for each individual | Initial points | Rounds per round | Max play time for each round | Response time in each round | Penalty for exceeding max play time |
|---|---|---|---|---|---|---|
| 2-Player Go-stop Game Contest | 2 million points | 10thousand | 10rounds | 7 mins. | 12 secs. | When exceeded, 1 penalty point |
| 3-Player Go-stop Game Contest | 2 million points | 10thousand | 10rounds | 6 mins. | 12 secs. | When exceeded, 1 penalty point |
| 4-Player Mahjong Game Contest | 3 million points | 10thousand | 10rounds | 5 mins. | 12 secs. | When exceeded, 1 penalty point |
| 5-Player Poker Game Contest | 5 million points | Ante 10thousand | 10rounds | 4 mins. | 12 secs. | When exceeded, 1 penalty point |

FIG. 26

| Method of Selecting Tournament Entrants | Selection in multiples of 2 | Selection in multiples of 3 | Selection in multiples of 4 | Selection in multiples of 5 |
|---|---|---|---|---|
| | 1,024 | 2,187 | 1,024 | 3,125 |
| Determined # of People | 2,048 | 6,651 | 4,096 | 15,625 |
| for Entering Tournament | 4,096 | 19,683 | 16,384 | 78,125 |
| (Select 1) | 8,192 | 59,049 | 65,536 | 390,625 |
| | 16,384 | 177,147 | 262,144 | 1,953,125 |
| Club Integrated Personnel Selection by League Day | 40% or less | 40% or less | 40% or less | 40% or less |
| Club Integrated Personnel Selection by Day | Allocated Personnelx1 /days in month | Allocated Personnelx1 /days in month | Allocated Personnelx1 /days in month | Allocated Personnelx1 /days in month |
| Club Integrated Personnel Selection After League | 60% or more | 60% or more | 60% or more | 60% or more |
| Personnel Selection by Each Club After League | Allocated Personnelx1 /# of clubs | Allocated Personnelx1 /# of clubs | Allocated Personnelx1 /# of clubs | Allocated Personnelx1 /# of clubs |

FIG. 27

METHOD AND SYSTEM FOR HOLDING CLUB-COMPETITION WEB BOARD GAME CONTEST

TECHNICAL FIELD

The present disclosure relates to a method and system for holding a club-competition web board game contest, and more particularly, to a method and system for allowing web board games such as go-stop, poker and mahjong to be enjoyed as league and tournament style contests by different players via a game club, wherein a company becomes an owner of a game club, and a user becomes a player affiliated in a game club, while using a contest game room to provide advertisement to all players participating in a game contest, so as to use advertisement revenue as funding for prize money to pay the contest prize winner.

BACKGROUND ART

A web board game that combines go-stop games and poker games offered online and classifies them as go-po games is a nationwide game that can be enjoyed by all ages and men and women, but online, it is branded as a game of gambling that can only be used by those over the age of 19.

This web board game is a game that is literally used for gambling, by betting money on an illegal gambling website and taking the money of an opponent. Although it seems like a game for fun, wherein game money is purchased through a legitimate website and game money comes and goes through games between individuals, such game money is cashed through an external money exchanger, so there are ongoing arguments that it promotes gambling and is substantially used for gambling.

For instance, a legitimate website operator sells game money to the user and, through the game, incurs a dealer fee of 3-7% of the stake for every round, so that if the game lasts for a certain amount of time, the entire game money sold to the user is to be collected again by the operator through dealer fees, and this structure leads the user to naturally repurchase the game money while playing the game.

Thus, if the user loses all of the game money, the user will pay again for the purchase, but even if the game is successful and game money is earned, when the game money is sold to the money exchanger, it is sold at a discounted price of 20~40%, and in addition to paying the dealer fee for selling through the game, there are many cases of online fraud without receiving the amount of money made from selling and the services are used in such a way that gambling, fraud and cheats are rampant.

In order to remedy these problems, the government has made a bill to regulate web board games, wherein it is not possible to exceed 500,000 won per month in purchasing game money for each individual, a limit for game money per round has been set that cannot be exceeded, members who have over a certain amount of game money cannot select a game room for selling game money, and such strong measures have been taken through legal measure in order to prevent the use of web board games for gambling.

Nevertheless, the internet is flooded with illegal gambling sites, and the 500,000 won per month for amusement set by the government is not a small amount of money, and as long as the human desire for feeling ecstasy through gambling and seizing opportunity exists, it remains a problem not only online, but also offline.

Meanwhile, an online game tournament system and a method of proceeding as a tournament system in which prize money is determined according to the number of wins is disclosed in Korean Patent Publication No. 10-2005-0001447, which is a patent that relates to paying an entry fee in a tournament contest and receiving prize money distributed according to the number of wins.

Betting on money (including tournaments) in this prior patent is a violation of the current law corresponding to gambling crimes, and has the problem of disregarding the fact that when the range of contest prize winners is expanded for any contest of a tournament contest, resultingly, it will become a structure where prize money is distributed according to the number of wins. Also, there is a problem that having a contest by a participating player specifying an opponent to compete with is an unacceptable way of matching in a tournament contest and is a distorted tournament contest which couldn't recognize that factors are sufficient for hindering tournament fairness.

Further, another prior patent, an online tournament contest hosting system, its hosting method, its ranking determining system and its ranking determining method disclosed in Korean Patent Publication No. 10-2007-0117217, hosts tournament contests for users and adopted a ranking system, in order to continuously maintain users from a multiple of competing companies, but there is a limit that the tournament contest is an event-like contest for ensuring loyalty to the company and preventing the users from straying off.

SUMMARY OF THE INVENTION

Technical Problem

The present disclosure has been devised to solve the above-described problems and is completely different from the conventional game system which has used web board games such as go-stop, poker and mahjong as games that promote gambling. The present disclosure is directed to providing a method and system for hosting club-competition web board game contest that allows a user participating in a game contest to experience participating in a champion series and a chance to receive contest prize money, at the same time, by hosting a club-competition league and tournament contest.

Further, an object of the present disclosure is to provide a method and system for hosting a club-competition web board game contest in which a user must secure the status of a player affiliated to a game club in order to participate in a contest, and accordingly, when a user designates a particular game club, the user can be active as an affiliated player of the corresponding game club.

Further, an object of the present disclosure is to provide a method and system for hosting a club-competition web board game contest that operates a game club house webpage so that various marketing activities such as advertisements, promotions, meetings, events and shopping can be performed, by including communication and contest information for users for each game club.

Further, an object of the present disclosure is to provide a method and system for hosting a club-competition web board game contest which considers that there is a difference in cognitive speed in game situations and in reaction speed for taking action after recognizing between men and women and between generations, so for example, contests are hosted by dividing the contest parts to youth/middle-aged/senior generations according to age difference and dividing into men/women according to gender.

Further, an object of the present disclosure is to provide a method and system for hosting a club-competition web board game contest in which players having different game clubs are allocated to the same contest game room since in a league contest, players having different game clubs need to compete.

Further, an object of the present disclosure is to provide a method and system for hosting a club-competition web board game contest that allocates players to the same contest game room such that by interlocking with a membership database, players having different game clubs as well as different regions are allowed to have a contest, in order to prevent players from playing games after planning with other players in the league contest.

Further, an object of the present disclosure is to provide a method and system for hosting a club-competition web board game contest in which a contest is hosted while limiting the number of contest participations to a predetermined number of times so that players in a league contest cannot participate in the tournament indefinitely.

Further, an object of the present disclosure is to provide a method and system for hosting a club-competition web board game contest in which, when a player in a league contest could not handle a predetermined contest schedule, for the fairness of the contest, the player can participate in an additional number of contest participating times, as much as the number of non-participated times.

Further, an object of the present disclosure is to provide a method and system for hosting a club-competition web board game contest that limits the usage time of a tournament in a league contest so that players who participate in the tournament cannot use the contest usage time indefinitely.

Further, an object of the present disclosure is to provide a method and system for hosting a club-competition web board game contest that allows all players in a league contest to start a contest with the same game points (start points) determined by contest rules, regardless of the previous tournament win/loss or score.

Further, an object of the present disclosure is to provide a method and system for hosting a club-competition web board game contest that automatically proceeds with the contest by a control module program regardless of a player's intention, if a player in a league contest exceeds a predetermined period of time determined by contest rules, for a smooth progression of a tournament.

Further, an object of the present disclosure is to provide a method and system for hosting a club-competition web board game contest in which, if a contest is proceeded by a control module program for a time exceeding a time specified by a player in a league contest, a penalty point is imposed to as a penalty.

Further, an object of the present disclosure is to provide a method and system for hosting a club-competition web board game contest in which, if a player in a league contest is disconnected during the contest, a penalty point is imposed on the player as a penalty for the disconnection.

Further, an object of the present disclosure is to provide a method and system for hosting a club-competition web board game contest in which, if a player in a league contest forfeits before the contest ends, a penalty point is imposed on the player as a penalty.

Further, an object of the present disclosure is to provide a method and system for hosting a club-competition web board game contest as a method for determining contest rankings in a league contest, that minimizes the redundancy of the contest rankings by using, as main elements, winning points, penalty points, score points, contest usage time, and the number of victory records for each divided scored section.

Further, an object of the present disclosure is to provide a method and system for hosting a club-competition web board game contest in which a winner is given positive winning points and a loser is given negative winning points for a win/loss result of a contest in a league contest, and the winning points are summed-up via a game account, wherein the summed-up winning points are used as a first priority for determining the contest ranking.

Further, an object of the present disclosure is to provide a method and system for hosting a club-competition web board game contest in which a penalty point is imposed to a player who plays against the contest rules, such as disconnecting during a contest in a league contest, forfeiting during a contest, exceeding the allotted time, and the penalty points are summed-up via a game account, wherein the summed-up penalty points are used as a second priority for determining the contest ranking.

Further, an object of the present disclosure is to provide a method and system for hosting a club-competition web board game contest in which the points scored or lost by a player in a league contest are summed-up via a game account, wherein the summed-up score points are used as a third priority for determining the contest ranking.

Further, an object of the present disclosure is to provide a method and system for hosting a club-competition web board game contest in which the time used in a contest by a player in a league contest is summed-up via a game account, wherein the summed-up usage time is used as a fourth priority for determining the contest ranking.

Further, an object of the present disclosure is to provide a method and system for hosting a club-competition web board game contest in which, a score point range is divided into several sections for each contest type such as go-stop, poker and mahjong in a league contest, and the contest records achieved for each section are separately summed-up via a game account, wherein the order of the score points in each section is used as a fifth priority for determining the contest ranking.

Further, an object of the present disclosure is to provide a method and system for hosting a club-competition web board game contest which provides a player in a league contest with a game account in which contest records of all types are recorded in detail.

Further, an object of the present disclosure is to provide a method and system for hosting a club-competition web board game contest which announces a list of tournament advancers and contest records on a homepage for ensuring transparency of the contest when the contest ends, and notifies that a player has been selected as a tournament contest advance candidate by text message and e-mail or the like.

Further, an object of the present disclosure is to provide a method and system for hosting a club-competition web board game contest in which, in selecting a contest prize winner who will advance to a tournament contest in a league contest, in order to increase the success of the competition, a certain number of prize winners are selected based on the ranking of the contest classified into multiple stages for each contest part, from the start date of the league contest to the end date of the league contest.

Further, an object of the present disclosure is to provide a method and system for hosting a club-competition web board game contest in which, in selecting a contest prize winner who will advance to a tournament contest in a league contest, a certain number of contest prize winners are selected based on a contest ranking classified into multiple stages for each club on a league contest ending date.

Further, an object of the present disclosure is to provide a method and system for hosting a club-competition web board game contest in which, the entire personnel advancing to a tournament contest for each contest in a league contest is selected in multiples according to the contest participating personnel configuration, for example, for a contest with 2 people participating, a multiple of 2, for a contest with 3 people participating, a multiple of 3 is applied.

Further, an object of the present disclosure is to provide a method and system for hosting a club-competition web board game contest that determines a contest prize winner based on a contest ranking classified into multiple stages when a contest in a league contest ends.

Further, an object of the present disclosure is to provide a method and system for hosting a club-competition web board game contest for providing a contest prize based on a payout ratio determined by contest rules for contest prize winners in a league contest.

Further, an object of the present disclosure is to provide a method and system for hosting a club-competition web board game contest in which only one of the highest scorers at the end of the contest in a tournament contest is determined as the tournament winner, and is given the qualification to advance to the next tournament contest.

Further, an object of the present disclosure is to provide a method and system for hosting a club-competition web board game contest in which, for determining a contest ranking of a contest participant in a final match of a tournament contest, the contest ranking is determined in the order of all-in, and for the rest of the participants, the contest ranking is determined by order of possessed score points at the end of the contest.

Further, an object of the present disclosure is to provide a method and system for hosting a club-competition web board game contest in which contest prize winners, including winners in tournament contests, receive contest prize money based on a payout ratio determined by contest rules.

Further, an object of the present disclosure is to provide a method and system for hosting a club-competition web board game contest in which a video advertisement is output to a contest game room through a ticker bar formed at the top of the contest game room.

Further, an object of the present disclosure is to provide a method and system for hosting a club-competition web board game contest in which, when a player clicks an advertisement display icon (menu) in a ticker bar during a game, a video advertisement is output to the contest game room.

Further, an object of the present disclosure is to provide a method and system for hosting a club-competition web board game contest in which, an advertisement display icon (menu) of a ticker bar is allowed to be clicked only once for each player.

Further, an object of the present disclosure is to provide a method and system for hosting a club-competition web board game contest in which, output is performed from a game club display advertisement to an information window of a player affiliated to the game club.

Further, an object of the present disclosure is to provide a method and system for hosting a club-competition web board game contest in which, in order to increase the attention rate of a game club display advertisement, a player affiliated to the game club is enlarged and output in a contest game room every time the player wins in a game.

Further, an object of the present disclosure is to provide a method and system for hosting a club-competition web board game contest in which, in order to increase the attention rate of a game club display advertisement, it is output to a display advertisement window arranged at the top of a contest homepage.

Further, an object of the present disclosure is to provide a method and system for hosting a club-competition web board game contest in which, in order to increase the attention rate of a game club display advertisement, it is output to a display advertisement window arranged at the top of a game club house webpage.

Further, an object of the present disclosure is to provide a method and system for hosting a club-competition web board game contest in which a contest prize money is procured by advertisement revenue generated from advertisements provided to users.

Further, an object of the present disclosure is to provide a method and system for hosting a club-competition web board game contest in which a contest prize money changes in real time depending on advertisement sales, and the changed contest prize money is disclosed in real time in a ticker bar formed at an upper part of a contest game room.

Further, an object of the present disclosure is to provide a method and system for hosting a club-competition web board game contest in which, contest prize money is provided separately to contest types such as go-stop, poker, and mahjong, prize money allocated to a corresponding contest type is provided separately to a league contest and a tournament contest, prize money allocated to the league contest is provided separately to a number of game clubs, prize money allocated to the game club is provided separately to a number of contest parts, prize money allocated to a number of contest parts is provided separately to each contest prize winner, who is the final target of the contest prize money, and further, prize money allocated to a tournament contest is provided separately to a number of contest parts, prize money allocated to a contest part is provided separately to each contest prize winner, who is the final target of the contest prize money.

Further, an object of the present disclosure is to provide a method and system for hosting a club-competition web board game contest, that discloses a contest prize money payout table on the tournament website, for providing prize money when a league contest is over, in order to ensure clarity of the amount of prize money to be paid to the contest prize winner and transparent operation.

Further, an object of the present disclosure is to provide a method and system for hosting a club-competition web board game contest in which, when a player purchases an avatar, the avatar is output to a player information window provided in the contest game window.

Further, an object of the present disclosure is to provide a method and system for hosting a club-competition web board game contest in which, if a player purchases a no-advertisement item, a video advertisement is not provided to the player.

Further, an object of the present disclosure is to provide a method and system for hosting a club-competition web board game contest that provides a player with the right to move a game club when the player purchases a club moving item.

Technical Solution

In order to achieve the above object, a method for hosting a club-competition web board game contest according to an embodiment of the present disclosure is configured to include the steps of: (a) joining membership by accessing a web page of a web board game contest hosting server and inputting personal information, by using a user terminal;

(b) joining a game club in order to play as an affiliated player of a game club of a web board game of which a company is the owner, by using the user terminal;

(c) participating in a league contest hosted by the web board game contest hosting server and playing as a player of the corresponding game club, by using the user terminal;

(d) determining a tournament entrant and a contest prize winner, after the league contest hosted by the web board game contest hosting server is over, and paying the contest prize money to the contest prize winner;

(e) allowing the tournament entrant to participate in a tournament contest hosted by the web board game contest hosting server and to play as a player of the corresponding game club by using the user terminal; and (f) determining contest prize winners, including the final winner, after the tournament contest hosted by the web board game contest hosting server is over, and paying the contest prize money to the contest prize winners.

Further, it is characterized in that in the above steps (c) or (e), the web board game contest hosting server divides and hosts the league contest and the tournament contest into generations and genders in a number of contest parts.

Further, it is characterized in that, in the above step (a), the web board game contest hosting server allocates a player to a contest part to participate in, based on personal information input.

Further, it is characterized in that, the web board game contest hosting server limits usage time of the player differently for each contest part.

Further, it is characterized in that, in the above step (b), if the rate at which the user has joined a particular game club exceeds twice the average rate of the entire game club, the web board game contest hosting server blocks joining the particular game club, and when the blocked particular game club reaches an average rate of the entire game club, it is reopened to allow a user to join the particular game club.

Further, it is characterized in that, in the above step (c), web board game contest hosting server allocates players whose game clubs are different from each other in the same contest game room of a league contest.

Further, it is characterized in that, in the above step (c), web board game contest hosting server classifies a region based on personal information and designates players from different game clubs and regions to the same contest game room in the league contest.

Further, it is characterized in that, in the above step (c), the web board game contest hosting server limits the number of times of participation in the web board game tournament to one day.

Further, it is characterized in that, in the above step (c), when a player in a league contest could not handle a predetermined contest schedule, the web board game contest hosting server adds a number of contest participating times, as much as the number of non-participated times.

Further, it is characterized in that, in the above step (c), when the player enters contest game room of the league contest, the web board game contest hosting server gives the same start points to anyone regardless of the previous tournament win or loss or score.

Further, it is characterized in that, in the above step (c), the web board game contest hosting server automatically proceeds with the league contest regardless of the player if the player exceeds a certain time determined by contest rules.

Further, it is characterized in that, the web board game contest hosting server imposes a penalty point to a player who has exceeded a time determined by contest rules.

Further, it is characterized in that, in the above step (c), the web board game contest hosting server imposes a penalty point to the player when disconnected during the league contest or when the player forfeits before the league contest ends.

Further, it is characterized in that, in the above step (d), the web board game contest hosting server determines contest prize winners based on the contest ranking, and the contest ranking is determined with priority based on winning points, penalty points, score points, contest usage time, and victory record for each score section.

Further, it is characterized in that, the winner of the league contest is given a positive winning point, the loser is given a negative winning point, and the summed-up points are used as a first priority for determining the contest ranking.

Further, it is characterized in that, if disconnected, forfeited, or the allotted time is exceeded during the league contest, a penalty point is imposed to the player and summed-up, wherein the summed-up penalty points are used as a second priority for determining the contest ranking.

Further, it is characterized in that, points scored or lost by the player in the league contest are summed-up, wherein the summed-up score points are used as a third priority for determining the contest ranking.

Further, it is characterized in that, time used in the league contest by the player are summed-up, and the summed-up contest usage time is used as a fourth priority for determining the contest ranking.

Further, it is characterized in that, a score point range is divided into several sections for each contest type in the league contest, and the contest records achieved for each section are separately summed-up, wherein the order of the score points in each section is used as a fifth priority for determining the contest ranking.

Further, it is characterized in that, in the above step (c), the web board game contest hosting server provides a game account in which a contest record is recorded on the user terminal of the player.

Further, it is characterized in that, in the above step (d), when the league contest ends, the web board game contest hosting server announces the tournament advance list and contest records on the homepage, and notifies that the player has been selected as a tournament entrant by text message and e-mail or the like.

Further, it is characterized in that, in the above step (d), the web board game contest hosting server determines the number of players entering the tournament by determining the number of people based on the contest ranking for each contest part from the start date to the end date of the league contest.

Further, it is characterized in that, in the above step (d), the web board game contest hosting server determines the number of players who have advanced to the tournament, and determines the number of people based on the contest ranking for each game club on the end date of the league contest.

Further, it is characterized in that, in the above step (d), the web board game contest hosting server selects the entire personnel advancing to a tournament contest for each contest in a league contest in multiples according to the league contest participating personnel configuration.

Further, it is characterized in that, in the above step (e), the web board game contest hosting server determines a contest ranking of a contest participant in a final match of a tournament contest in the order of all-in, and for the rest of the participants, the contest ranking is determined by order of possessed score points when the tournament contest is over.

Further, it is characterized in that, in the above steps (d) or (f), the contest prize is procured from an advertisement revenue generated from an advertisement provided to the user terminal.

Further, it is characterized in that, the contest prize money changes in real time according to the sales of the advertisement, and the changed contest prize is disclosed in real time on a ticker bar formed at an upper part of the contest game room.

Further, it is characterized in that, among the above advertisements, in the case of a video advertisement, the advertisement is output to a ticker bar formed at an upper part of the contest game room.

Further, it is characterized in that, the advertisement of the video is output when a player clicks an advertisement display icon provided on the ticker bar during the progress of the game.

Further, it is characterized in that, the click of the advertisement display icon is limited to once for each player.

Further, it is characterized in that, the contest prize money is provided separately for each contest type, and prize money allocated to a corresponding contest type is provided separately to a league contest and a tournament contest, prize money allocated to the league contest is provided separately to a number of game clubs, prize money allocated to the game club is provided separately to a number of contest parts, prize money allocated to a number of contest parts is provided separately to each contest prize winner, prize money allocated to a tournament contest is provided separately to a number of contest parts, and prize money allocated to a contest part is provided separately to each contest prize winner.

Further, it is characterized in that, among the above advertisements, a display advertisement for a game club is output to an information window of a player affiliated to the game club provided in the contest game window.

Further, it is characterized in that, the game club display advertisement is enlarged and output each time the player affiliated to the game club wins.

Further, it is characterized in that, the display advertisement of the game club is output to a display pop-up advertisement configured on a league contest or tournament contest homepage or a display pop-up advertisement configured on a game club house web page.

Further, it is characterized in that, in the above steps (c) or (e), the web board game contest hosting server outputs to a player information window provided in the contest game window when a player purchases an avatar.

Further, it is characterized in that, in the above steps (c) or (e), the web board game contest hosting server does not provide an advertisement of a video to the user terminal of the player when the player purchases a no-advertisement item.

A system for hosting club-competition web board game contest according to the embodiment of the present disclosure includes, a web board game contest hosting server, wherein a number of companies become owners of game clubs of web board games, to host web board games as league contests and tournament contest, and a web page environment (contest game window) is provided so that a player affiliated to a game club can connect and play via a user terminal, wherein contest prize money paid to a contest prize winner of the league contest and the tournament contest is procured from an advertisement revenue generated from advertisements provided to a user terminal; and a user terminal connected to the web board game contest hosting server via a wired/wireless network to join membership and join a game club as an affiliated player, participating in the league contest and the tournament contest to play as an affiliate of the corresponding game club.

Further, it is characterized in that, the web board game contest hosting server hosts a league contest and a tournament contest in a number of contest parts divided by generation and gender, and a player's usage time is limited differently for each contest part.

Further, it is characterized in that, the contest game window consists of a contest game room at a lower part and a ticker bar at an upper part, wherein, in the contest game room, one side has information windows of players as many as the players participating in the contest game, wherein, the ticker bar includes a real-time contest prize money output part that outputs contest prize money in real-time, and a video advertisement output part that outputs a video advertisement and includes an advertisement display icon.

In addition, it is characterized in that, the web board game contest hosting server determines the contest prize winners based on the contest ranking, but the contest ranking is determined with priority in the order of winning points, penalty points, score points, contest usage time, and the number of victory records for each score section.

Advantageous Effects

According to the technical solutions described above, the conventional method of providing games for amusement used between individuals or games used as gambling has been avoided, and companies become owners of game clubs, while users become members of clubs, leagues and tournaments. When a game tournament is hosted in the form of a system, an advertisement is provided through a contest game room, and the advertisement revenue is provided as a fund for the contest prize money, and the contest prize money is paid to the contest prize winners. Thus, a user may experience a new form of electronic sports (e-sports) game culture, which is completely different from conventional games, but has the greatest fun and chances and further enhances the fun of games.

Further, by offering web board games such as go-stop, poker, and mahjong that are branded as gambling games as electronic sports in the form of a champion series, the paradigm of web board games can be changed.

Furthermore, the company becomes the owner of the game club, and all customers (users) participating in the tournament can increase the attention of the advertisement of their corporate brand and products.

In addition, through the club-competition league and tournament contests, the advertisement provided to all users serves as a financial source used as the user's contest prize money, thereby increasing the intimacy with the advertising company, unlike the conventional case. In addition, the customer and the company can form an organic relationship, and as all users are players affiliated to game clubs, it is possible to feel a sense of unity with the advertisement of the corresponding company.

BRIEF DESCRIPTION OF THE DRAWINGS

FIGS. 6 to 15 are illustrations for helping the understanding of the web board game contest hosting method according to an embodiment of the present disclosure.

FIG. 16 to FIG. 19 are exemplary views for explaining a method of providing contest prize money in the web board game contest hosting method according to the embodiment of the present disclosure.

FIG. 20 is an exemplary view of a game account provided to a player in the web board game contest hosting method according to the embodiment of the present disclosure.

FIG. 21 is an exemplary diagram illustrating a method of giving a contest winning point in the web board game contest hosting method according to the embodiment of the present disclosure.

FIG. 22 is an exemplary diagram illustrating how to give a contest penalty point in the web board game contest hosting method according to the embodiment of the present disclosure.

FIG. 23 is an exemplary diagram illustrating a method of summing up contest time in the web board game contest hosting method according to the embodiment of the present disclosure.

FIG. 24 is an exemplary diagram illustrating a method of summing up score points in the web board game contest hosting method according to the embodiment of the present disclosure.

FIG. 25 and FIG. 26 are views illustrating conditions suitable for game characteristics for each contest part in the web board game contest hosting method according to the embodiment of the present disclosure.

FIG. 27 is an exemplary diagram illustrating a method of selecting tournament entrants in the web board game contest hosting method according to the embodiment of the present disclosure.

MODE FOR CARRYING OUT THE INVENTION

Figure 1:
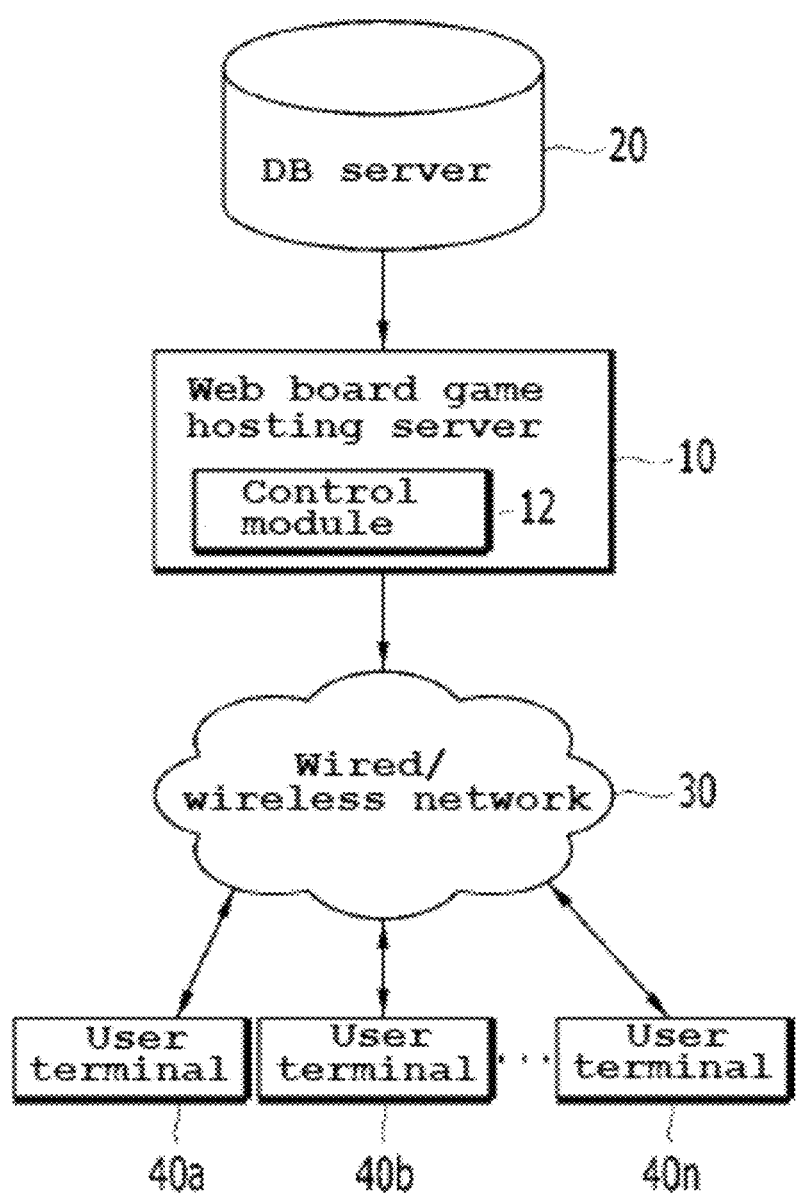
FIG. 1 is a schematic configuration diagram of a web board game contest hosting system according to an embodiment of the present disclosure.

First, terms used in the present disclosure to help understand the present disclosure will be described.

A game club is an organization in which many people, mainly companies, gather in an unspecified number to participate in a game tournament.

Although similar in concept to existing electronic sports pro clubs, there is a difference in that electronic sports pro clubs are made up of a small number of elite players with excellent abilities, and game clubs are made up of an unspecified number of players.

A player refers to a player who is affiliated to a game club and participates in a game tournament.

A league contest is a contest in which the above-mentioned game clubs compete with each other for winning or losing according to contest rules. For example, the league contest is hosted in a series of opening on the first day of each month and closing on the last day of every month.

In this league contest, it is possible to participate in contest types such as go-stop, poker, and mahjong, for example, regardless of time, but limited to three times a day. The contest is proceeded such that each contest type is divided into 6 parts, and tournament contest entrants are selected based on the contest ranking. Further, the contest prize winners are selected and are provided with the contest prize money based on a payout ratio determined by contest rules.

A tournament contest is a tournament in which the tournament is hosted only with personnel selected from the league contests, and the final winner is selected for each contest part. The final winner receives contest prize money based on a payout ratio determined by contest rules.

A point system of winning points is a system in which a winner and a loser are each given a point when the tournament ends, and the points are summed-up in a game account to be a first element for determining contest ranking (first priority).

A penalty point system is a system in which a penalty point is imposed as a penalty when a player does not observe the rules of the tournament, and the points are summed-up in a game account to be a second element for determining contest ranking (second priority).

A score point totaling system is a system in which a player confirms the points gained and lost for each contest when the contest ends, and the points are summed-up in a game account to be a third element for determining contest ranking (third priority).

A total usage time system is a system in which the time used by each player for each contest is confirmed and granted when the contest ends, and the usage time is summed-up in a game account to be a fourth element for determining contest ranking (fourth priority).

A scoring section system divides a scoring unit into several sections (for example, 9 sections) for each contest type, such as go-stop, poker, and mahjong, and they are summed-up in a game account according to sorting order to be a fifth element for determining contest ranking (fifth priority).

A ticker bar is a display unit that displays a website in an information providing window configured at an upper part of a contest game window, and an output part that sends out the contest prize amount in real time, and an output part that sends out a video advertisement.

A player information window is a window provided inside the contest game window for providing information on players participating in the tournament. At the upper part of the information providing window, the player's avatar or the display advertisement of the club that the player is affiliated to, and at the lower part shows contest-related information.

Hereinafter, the configuration and operation of the present disclosure will be described with reference to the accompanying drawings according to embodiments of the present disclosure.

FIG. 1 is a schematic configuration diagram of a web board game contest hosting system according to an embodiment of the present disclosure.

As shown in FIG. 1, the web board game contest hosting system according to the embodiment of the present disclosure includes a web board game contest hosting server 10 and a number of user terminals 40a, 40b, . . . , 40n which are connected through a wired/wireless network 30. The web board game contest hosting server 10 stores information necessary for hosting the web board game tournament in the DB server 20 and operates in conjunction with the web board game contest, and is provided with a control module 12 inside to manage the progress of a web board game contest.

The information stored in the DB server 20 includes, for example, member information, club information, game information, contest record information, contest prize money information, contest prize winner information, advertisement information, and item information.

The control module 12 includes, for example, a member management unit, a club management unit, a game management unit, a contest management unit, an information providing unit, a settlement unit, an advertisement unit, an item management unit, and the like.

The user terminals 40a, 40b, . . . , 40n are input/output devices for the player to communicate with the web board game contest hosting server 10 via the wired/wireless network 30 in order to execute the web board game. For example, not only a desktop personal computer but also a wired personal computer, such as a notebook personal computer, a workstation, a palm top computer, a personal digital assistant (PDA), a web pad, and a mobile communication terminal (smart phone). Alternatively, it may be embodied by a device that can wirelessly connect to a network and exchange information.

The user terminals 40a, 40b, . . . , 40n connect to a web page operated by the web board game contest hosting server 10 and input basic personal information, ID and password, etc. to join membership. After joining membership, the user can join a desired game club to be affiliated thereto and participate in a game contest.

Basic personal information may include, for example, a name, first six digits in the front and first one digit in the back of a resident registration number, a residence area, a telephone number, an e-mail address, and the like.

The user terminals 40a, 40b, . . . , 40n each include a web browser as an application program used for searching for web information, which connects to the web board game contest host server 10 to display a web page provided by the web board game contest host server 10 on a screen.

When the player enters the partial contest server displayed on the web page, various information necessary for executing the web board game is received from the web board game contest hosting servers 40a, 40b, . . . 40n, and if the game is an old version, a new version of the game is downloaded and installed from the web board game contest hosting server.

When the user terminals 40a, 40b, . . . , 40n connect to the web board game contest hosting server 10 and execute the game, data necessary for executing the game is received from the web board game contest hosting server 10, and a game progress screen (contest game window) based thereon is displayed on the user terminals 40a, 40b, . . . 40n.

The web board game contest hosting server 10 provides web pages to the user terminals 40a, 40b, . . . , 40n in order to provide the web board game to the players, and it possible to perform operations on the web pages provided by the web board game contest hosting server, such as joining membership, joining/moving a game club, and starting a game.

Further, if the program for executing the web board game is not installed, the program for the web board game is installed, and in the case of an old version, the program is updated to the new version.

The web board game contest hosting server 10 can divide a tournament by age and gender, and can host games with separate contest servers for each of the divided contest parts. Players are allocated such that the players can enter corresponding contest servers according to age and gender.

Figure 2:
FIG. 2 is a flowchart illustrating a web board game contest hosting method according to an embodiment of the present disclosure.

FIG. 2 is a flowchart illustrating a web board game contest hosting method according to an embodiment of the present disclosure.

The user uses the user terminals 40a, 40b, . . . , 40n to enjoy the web board game hosted on the web board game contest hosting server, connects to the web board game contest hosting server 10, and inputs necessary information in order to join as a member. The web board game contest hosting server registers as a member based on the information input by the user terminal in step S20.

The information required here is the user's personal information, ID and password. Personal information includes, for example, a name, first six digits in the front and first one digit in the back of a resident registration number, a residence area, a telephone number, an email address or the like.

At this time, the web board game contest hosting server 10 considers that there is a difference between the gender and the generation in the speed of recognizing the game situation and the reaction speed of taking action after the recognition due to the characteristics of the web board game. Users are classified according to age and gender based on personal information.

For example, there can be a classification of youth under 39 years old, middle-aged between 40 and 59 years old, and seniors over 60 years old, as well as gender classification. The contest is divided into six contest parts and hosted, including youth men's club (part), youth women's club, middle-aged men's club, middle-aged women's club, senior men's club and senior women's club, and hereinafter, it will be described below based on this (see FIG. 6).

Next, the user connects to the web board game contest hosting server 10 using the user terminals 40a, 40b, . . . , 40n, and selects a game club to which the user will be affiliated to and be active as a player in step S21.

At this time, if the rate at which the user has joined a particular game club exceeds twice the average rate of the entire game club, the web board game contest hosting server 10 blocks the joining of the particular game club. When the particular game club blocked reaches an average percentage of the total game club, it is reopened to allow users to join the game club.

Further, a game club house may be separately configured so that a user can be active for each game club in step S21.

Next, when the user joins the game club, the web board game contest hosting server 10 classifies the contest part for each game club by gender and generation into a total of six parts, and allocates to any one of the contest parts in step S22.

In other words, men 39 years old and under are allocated to the youth men's club, women 39 years old and under are allocated to the youth women's club, men 40~59 years old are allocated to the middle-aged men's club, women 40~59 years old are allocated to the middle-aged women's club, men 60 years and over are allocated to the senior men's club, and women 60 years and over are allocated to the senior women's club (see FIG. 6).

At this time, the number of participants can be further divided into generations according to the number of participants in the tournament and the size of the contest prize money.

Figure 8:

Next, the user enters the league contest game room of the allocated contest part on the user terminals 40a, 40b, . . . , 40n (see FIG. 7), and as shown in FIG. 8, a web board game such as go-stop is played by players as players affiliated to game clubs in step S23.

At this time, the web board game contest hosting server 10 can assign a tournament server for each contest type, such as go-stop, poker, and mahjong, and can assign a contest server for each of the separated six contest parts. League contests and tournament contests can be distinguished, and contest servers can be assigned accordingly.

In FIG. 7, for example, when a 62 year-old man participates in a poker tournament, he enters a contest server of a 5-player poker contest of the senior men's club.

Further, the web board game contest hosting server 10 can designate players having different clubs to the same contest game room so that players having different game clubs can have a contest.

Further, the web board game contest hosting server 10 can distinguish city roads based on the data of the area recorded in the member information of the DB server 20, and designate players in different areas to the same contest game room.

Further, the web board game contest hosting server 10 sets the number of times of participation in the tournament, such as go-stop, poker and mahjong, can be limited to three times per day, for example, so that the player cannot participate in the tournament indefinitely.

Further, when the player cannot handle the tournament schedule, the web board game contest hosting server 10 can add a number of contest participating times, as much as the number of non-participated times.

Further, the web board game contest hosting server 10 can specify and limit the usage time for each contest part so that the player cannot use the contest usage time indefinitely.

For example, as shown in FIG. 25, in the youth men's club contest, the time limit for the 2-players go-stop game contest can be limited to 6 minutes, the time limit for the 3-players go-stop game contest can be limited to 5 minutes, the time limit for the 4-players mahjong game contest can be limited to 4 minutes, and the time limit for the 5-players poker game contest can be limited to 3 minutes. As shown in FIG. 26, the limited time for the middle-aged women's club can be extended such that the time limit for the 2-players go-stop game contest can be limited to 7 minutes, the time limit for the 3-players go-stop game contest can be limited to 6 minutes, the time limit for the 4-players mahjong game contest can be limited to 5 minutes, and the time limit for the 5-players poker game contest can be limited to 4 minutes.

Further, when the player enters the contest game room, the web board game contest hosting server 10 gives the same points (start points) to anyone without being associated with the previous tournament win/loss or score.

Further, if the player wins the tournament, the web board game contest hosting server 10 awards the winning point determined by the contest rules, and if the player loses, the negative winning point (losing point) determined by the contest rules is given (see FIG. 21), and is summed-up separately in a game account (see FIG. 20).

It can be seen that the winning points of "that day" in the game account of the go-stop in FIG. 20 is 2 points, the winning points for this month is 10 points, and the winning points for last month is 7 points.

Figure 4:
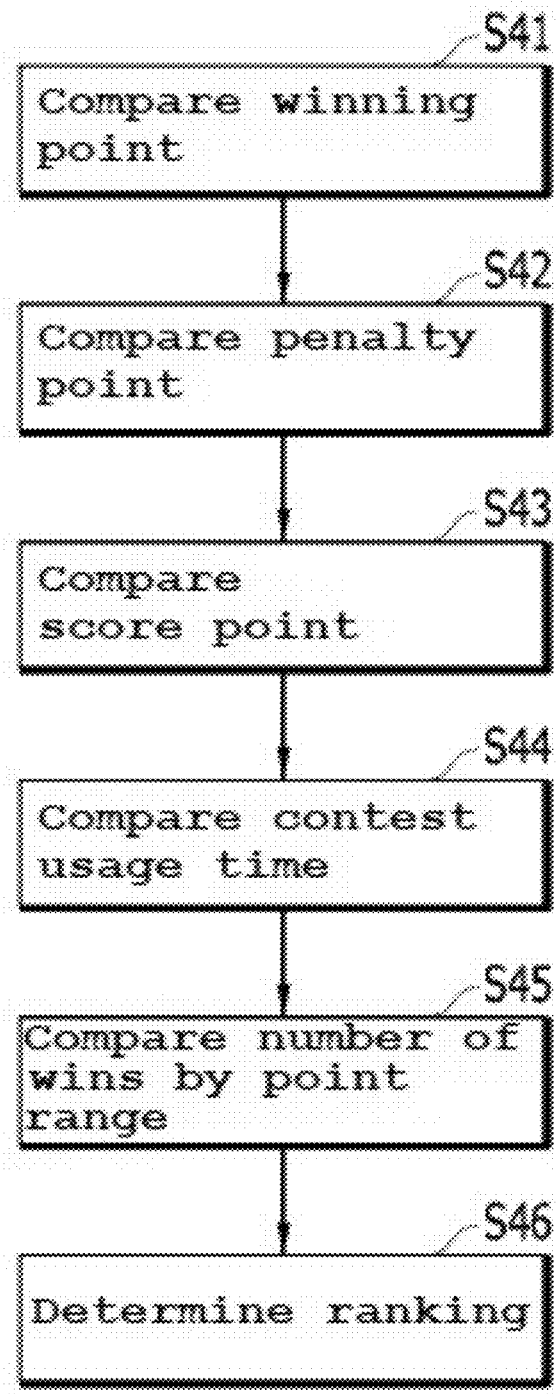
FIG. 4 is a flowchart illustrating a method of determining a result of a web board game tournament and a ranking of a tournament winner according to an embodiment of the present disclosure.

The web board game contest hosting server 10 uses the summed-up points of the player as the first priority in determining the contest ranking (see step S41 in FIG. 4).

Further, the web board game contest hosting server 10 automatically proceeds the game by the control module 12 if the player who has consumed the time limit does not proceed with the game during the normal play time determined by the contest rules.

In the case described above, the web board game contest hosting server 10 gives a penalty point (for example, 1 point) to the player, and gives a penalty point (for example, 2 points) if the player is disconnected during the contest. If the player forfeits during the tournament, a penalty point (for example, 5 points) is given (see FIG. 22), and the player's penalty points are separately summed-up in the game account (see FIG. 20).

It can be seen that the penalty points on that day in the go-stop game account of FIG. 20 is 2 points, the penalty points for this month is 7 points, and the penalty point for last month is 20 points.

The web board game contest hosting server 10 uses the added penalty points of the players as the second priority in determining the contest ranking (see step S42 in FIG. 4).

Further, if the player wins the tournament, the web board game contest hosting server 10 gives a score determined by the contest rules, and if a player loses in the tournament, the server gives a score determined by the contest rules to the game account (see FIGS. 20 and 24).

It can be seen that the scoring (score points) of that day on the go-stop game account in FIG. 20 is 500,000 points, the scoring of this month is 5,500,000 points, and the winning points of last month is 7,500,000 points.

The web board game contest hosting server 10 uses the summed-up scores of the players as the third priority in determining the contest ranking (see step S43 in FIG. 4).

Further, when the tournament ends, the web board game contest hosting server determines the time used by the player as the contest usage time, and sums up the time separately in the game account (see FIGS. 20 and 23).

It can be seen that the usage time on that day in the go-stop game account of FIG. 20 is 12 minutes 52 seconds, the usage time this month is 120 minutes 11 seconds, and the usage time last month is 420 minutes 15 seconds.

The web board game contest hosting server 10 uses the summed-up contest usage time of the players as the fourth priority in determining the contest ranking (see step S44 in FIG. 4).

Further, the web board game contest hosting server 10 divides the score section by the contest points for each contest type, such as go-stop, poker, and mahjong, for example, into nine sections. When the contest ends, it is recorded at which score section range the player won, and the number of victory records is summed-up for each score section in the game account (see FIG. 20).

The score section range in the go-stop game account shown in FIG. 20 is divided into 9 sections including, 800,000 points or more, 700,000~790,000 points, 600,000~690,000 points, 500,000~590,000 points, 400,000~490,000 points, 300,000~390,000 points, 200,000~290,000, 100,000~190,000 points, and 90,000 point or less. The number of victory records of this month is 1 time for 800,000 points or more, 2 times for 700,000~790,000 points, 3 times for 600,000~690,000 points, 2 times for 500,000~590,000 points, 4 times for 400,000~490,000 points, times for 300,000~390,000 points, 7 times for 200,000~290,000, 15 times for 100,000~190,000 points, and 22 times for 90,000 point or less.

The web board game contest hosting server 10 uses the number of victory records added for each player's score section as the fifth priority in determining the contest ranking (see step S45 in FIG. 4).

The process of determining the contest ranking as described above will be described with reference to FIG. 4. The summed-up points of the players are designated as the first priority for determining the contest ranking and compared with each other in step S41.

Next, the summed-up penalty points of the players are designated as a second priority for determining the contest ranking, and are compared with each other in step S42.

Next, the points of the summed-up points of the players are designated as the third priority for determining the contest ranking and compared with each other in step S43.

Next, the summed-up usage time of the players is designated as the fourth priority for determining the contest ranking and compared with each other in step S44.

Next, the number of victory records summed-up for each score section of the player is designated as a fifth priority for determining the contest ranking and compared with each other in step S45.

The following is a more detailed description of step S45 when the contest type is go-stop.

The number of records of the player who has won in the score section of 800,000 points or more is designated as the 5-1st element (5-1st priority) that determines the contest ranking and compared with each other.

The number of records of the player who won in the score section in the 700,000~790,000 point range is designated as the 5-2 element (5-2nd priority) for determining the contest ranking and being compared with each other.

The number of records of the player who has won in the score section in the 600,000~690,000 point range is designated as the 5-3 element (5-3rd priority) for determining the contest ranking and being compared with each other.

The number of records of the player who won in the score section in the 500,000~590,000 point range is designated as the 5-4 element (5-4th priority) for determining the contest ranking and being compared with each other.

The number of records of the player who won in the score section of the player in the range of 400,000~490,000 points is designated as a 5-5 element (5-5th priority) for determining the contest ranking and being compared with each other.

The number of records of the player who won in the score section in the range of 300,000~390,000 points is designated as the 5-6 element (5-6th priority) for determining the contest ranking and being compared with each other.

The number of records of the player who won in the score section in the 200,000~290,000 point range is designated as the 5-7 element (5-7th priority) for determining the contest ranking and being compared with each other.

The number of records of the player who won in the score section in the 100,000~190,000 point range is designated as a 5-8 element (5-8th priority) for determining the contest ranking and being compared with each other.

The number of records that have won in the range where the scored section is 90,000 points or less is designated as the 5-9 element (5-9th priority) for determining the contest ranking and being compared with each other.

Furthermore, if the contest is a poker game, the scored section can be divided into 9 sections including, 3.2 million points or more, 2.80~3.19 million points, 2.40~2.79 million points, 2.00~2.39 million points, 1.60~1.990 million points, 1.20~1.59 million points, 0.80~1.90 million points, 0.40~0.79 million points, and 0.39 million points or less. The number of records won in the corresponding score section is designated as the fifth element for determining the contest ranking and being compared with each other.

Similarly, if the tournament is a mahjong game, the scored section can be divided into 9 sections including, 2.4 million points or more, 2.10~2.39 million points, 1.80~2.09 million points, 1.50~1.79 million points, 1.20~1.49 million points, 0.90~1.19 million points, 0.60~0.89 million points, 0.30~0.59 million points, and 0.29 points or less. The number of records won in the score section is designated as the fifth element for determining the contest ranking and being compared with each other.

Here, the score section is an example in which the basic points of go-stop and mahjong are 10,000 points, and the basic poker Ante (points that the player gives to the basics before the game starts) is 10,000 points. If different points are applied, points can be applied differently for each scored section divided into 9 sections.

Then, the first priority, the second priority, the third priority, the fourth priority, and the fifth priority are compared in order to determine a league contest or a tournament contest ranking in step S46.

Next, when the league contest closes at the end of each month, the web board game contest hosting server 10 determines a tournament entrant for each contest part based on the above-mentioned contest ranking in step S24.

At this time, as shown in FIG. 27, although the total number of personnel who advance to the tournament contest is selected as a multiple of the tournament contest composition, among the personnel who advance to the tournament contest, those who correspond to 40% or less are selected evenly every day during the league contest period, and for 60% or more, they are selected evenly for each game club after the league contest ends.

For example, in a league contest with two players (e.g., 2-players go-stop contests), tournament contest entrants are selected by a multiple of two, i.e., four players are selected as tournament contest entrants, and in a league contest with five players (e.g., 5-players poker contest), tournament contest entrants are selected by a multiple of 5, i.e., 25 players are selected as tournament contest entrants.

Further, even after the selection by game club, the web board game contest hosting server 10 designates the remaining personnel per club one by one according to the scale of the players who have joined the game club, and the final list of tournament entrants advanced to the tournament contest is disclosed on the homepage.

Furthermore, the web board game contest hosting server 10 notifies tournament advancers of the contest participation and the tournament schedule by text message, e-mail, or the like.

Further, when the league contest closes at the end of each month, the web board game contest hosting server 10 determines the tournament winners based on the contest ranking classified into the five elements shown in FIG. 4 over 6 contest parts for each game club. Then, the contest prize money is paid to the winners of the tournament based on the payout ratio determined by the contest rules (see FIGS. 16 to 19).

Here, the contest prize money is funded by the advertisement sales shown in FIG. 3 described later.

The next tournament advancer uses the user terminals 40*a*, 40*b*, . . . , 40*n* to connect to the web board game contest hosting server 10, and enters and participates in the tournament contest part in step S25.

At this time, the web board game contest hosting server 10 notifies the tournament contest schedule and assigns a tournament server to each tournament contest portion.

Next, the tournament contest participant plays the game type as a player affiliated to the game club in step S26.

At this time, when the tournament contest ends, the web board game contest hosting server 10 determines only the highest scorer as the next tournament contest advancer, and treats those who have not participated in the tournament as being defeated. The tournament results are given the results of the previous stage.

In the final match of the tournament contest, which determines the final winner of the tournament, the contest ranking is determined in the order of All-in in order to determine the winning order of all the participants sequentially, and the contest ranking of the rest of the personnel is determined in the order of score points when the contest ends.

Next, the contest rankings are determined in the order of the scores as described above, and the tournament prize winners including the winners are determined in step S27.

Then, the contest prize money is paid to the contest prize winners including the winners based on the payout ratio determined by the contest rules (see FIGS. 16 to 19) in step S28.

Here, the contest prize money is funded by the advertisement sales shown in FIG. 3 described later.

Figure 3:
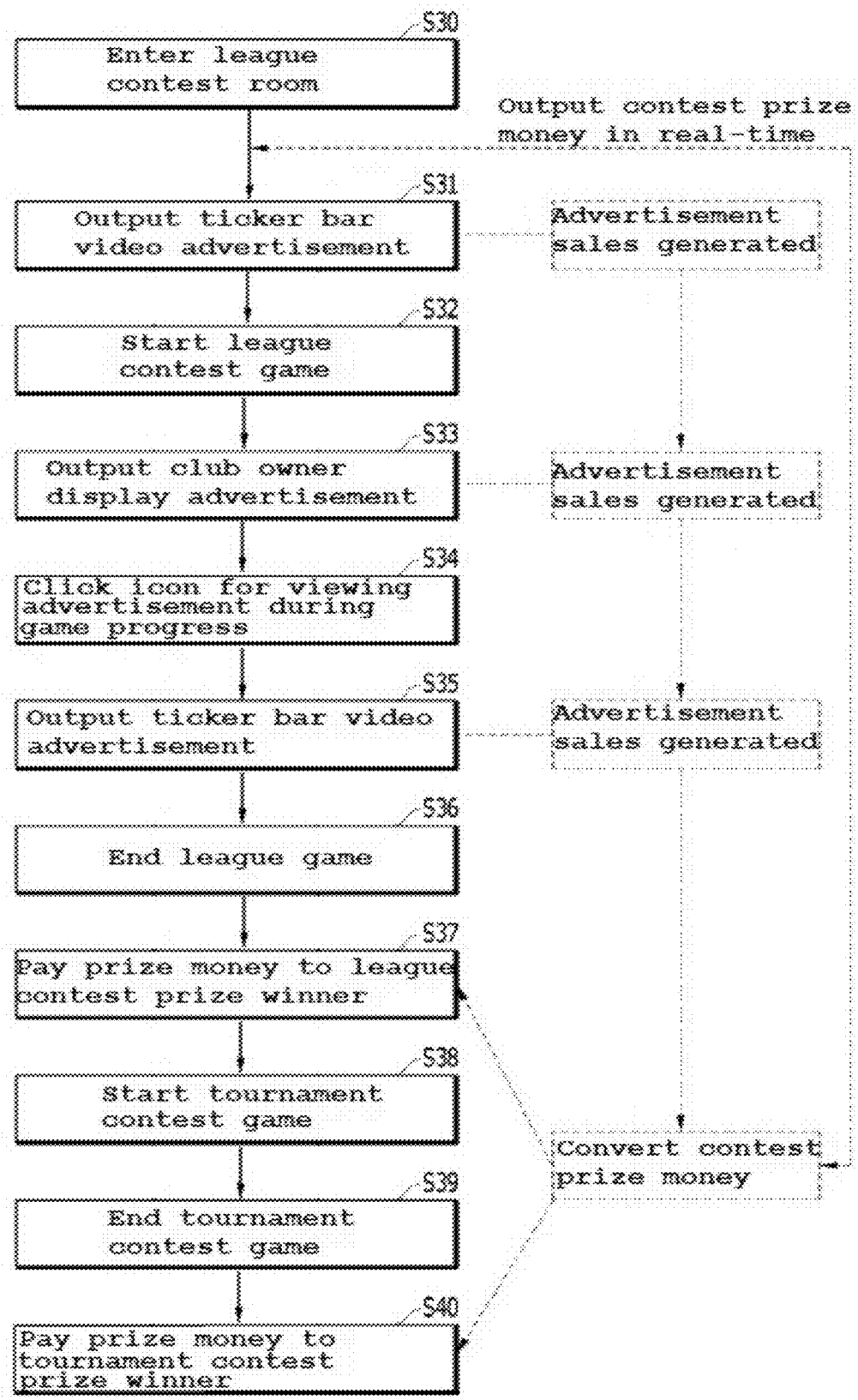
FIG. 3 is a flowchart illustrating a process of converting an advertisement sale into a contest prize money and providing the contest prize money during a web board game tournament according to an embodiment of the present disclosure.

FIG. 3 is a flowchart illustrating a process of converting an advertisement sale into a contest prize during a web board game contest to provide to the contest prize winner according to an embodiment of the present disclosure.

Figure 5:
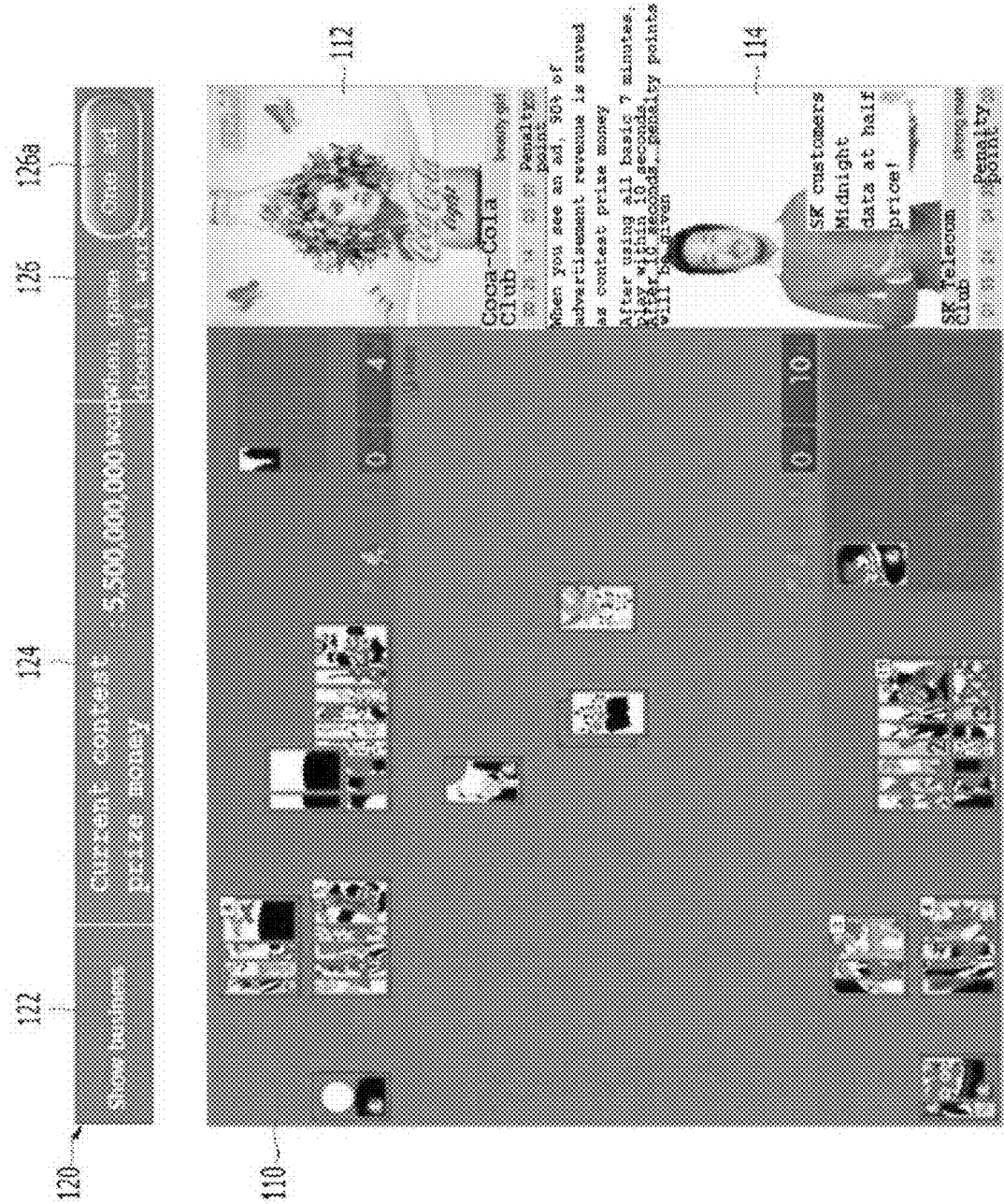
FIG. 5 is an exemplary view illustrating a contest game window of the web board game contest hosting method according to the embodiment of the present disclosure.

When the player enters the league contest game room in step S30, a contest game window as shown in FIG. 5 is output to the screens of the user terminals 40a, 40b, . . . , 40n.

FIG. 5 shows a screen when the contest type is go-stop for two players. The contest game window includes a lower contest game room 110 and an upper ticker bar 120. Player information windows 112 and 114 are provided on the right side as many as the players who participated in the contest game.

The ticker bar 120 includes a website display unit 122, a real-time contest prize output part 124, and a video advertisement output part 126. The video advertisement output part 126 is provided with an advertisement display icon (menu) 126a so that a player can see a video advertisement during the game.

Figure 15:
Figure 16:
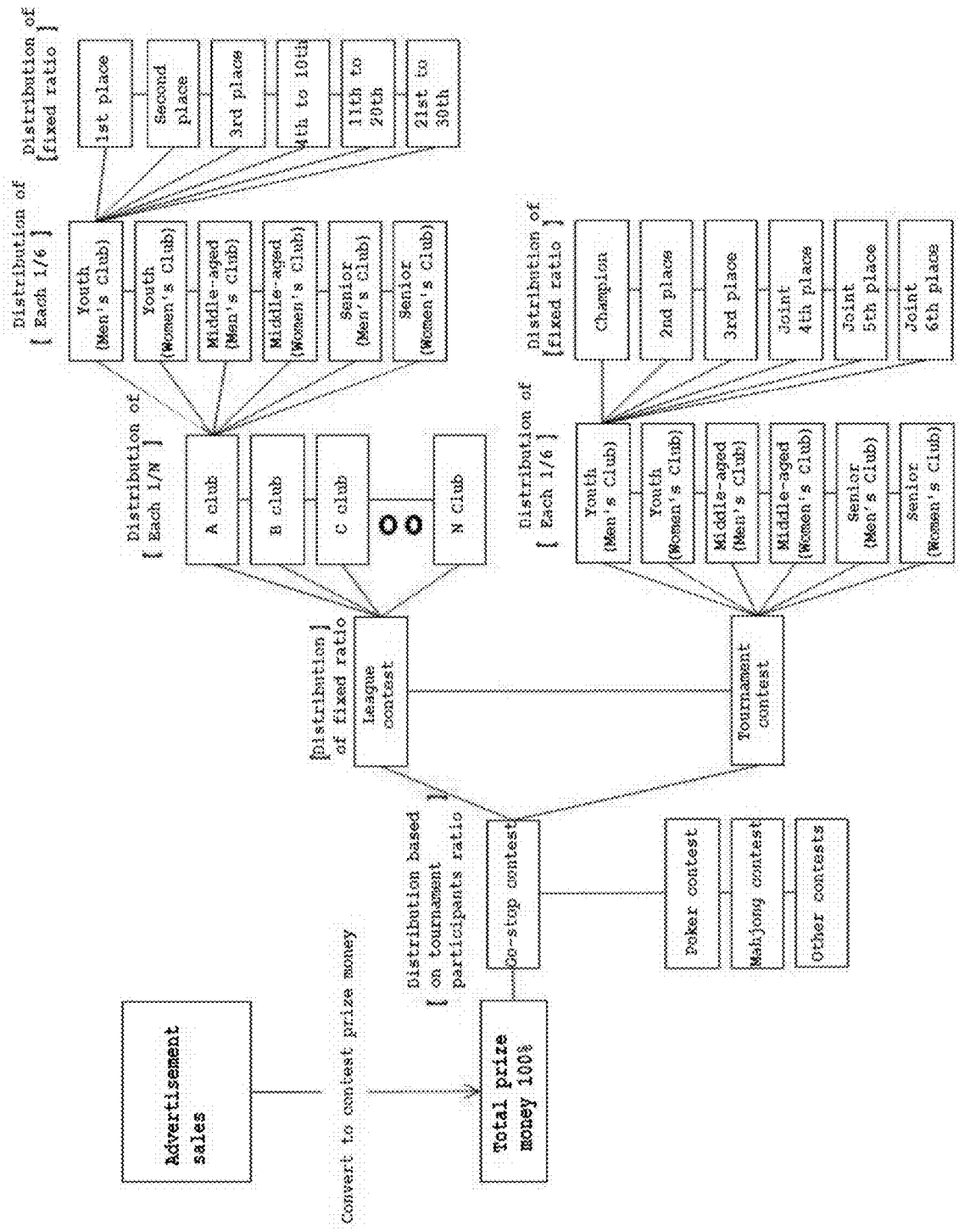

When a player enters the game room of the league contest in step S30, the contest prize is output in real time to the real-time contest prize output part 124 of the ticker bar 120, and the video advertisement is output to the video advertisement output part 126 as shown in FIG. 15 in step S31.

Here, since the contest prize money changes in real time according to the sales of the advertisement, the changed contest prize is output in real time at the ticker bar 120 formed at the upper part of the contest game window.

Next, when the league contest game starts in step S32, the display advertisement of the game club to which the player belongs is output to the information windows 112 and 114 of each player while the output of the video advertisement is stopped in step S33.

Figure 9:
Figure 13:
Figure 14:

On the other hand, in addition to the above-mentioned step S33, a display advertisement of a game club, which is a source of the contest prize, can be enlarged and output to the contest game window every time a player wins the game (see FIG. 9). The output can be provided by providing a display pop-up advertisement at the top of the homepage (see FIG. 13) or by providing a display pop-up advertisement at the top of the club house web page (see FIG. 14).

Next, when the player clicks the advertisement display icon 126a while the game is in progress in step S34, a video advertisement is output to the contest game window in step S35.

At this time, the advertisement display icon 126a allows a click only once for each player.

Sales are generated by the advertisement output in steps S31, S33, and S35, and the sales are converted into contest prize money, which is thereafter provided to contest prize winners.

That is, after the league contest game is ended in step S36, or the tournament advance game is started by the tournament entrant in step S38 and ended in step S39, the contest prize is paid to the contest prize winner ins steps S37 and S40, the contest prize will be funded by the advertisement.

Referring to FIGS. 16 to 19, the steps S37 and S40 for providing the prize will be described in further detail. As described above, the contest prize is raised from the advertisement revenue generated from the advertisement provided to the user, and poker, mahjong, etc., and will be paid separately based on the participation ratio of contest participants.

In addition, the tournament prize allocated to each event is divided into league contests and tournament contests, and paid for each tournament based on a fixed ratio.

Furthermore, the contest prize allocated to each league contest is divided into game clubs and paid equally to each club, and the contest prize allocated to each game club is divided into six contest parts and divided evenly and provided to each contest part. The contest prize money allocated to each contest part is divided evenly by the order of the contest prize winners, and the ratio of the contest prize payment based on the order of the tournament winners is determined, and the contest prize money is provided based on the ratio.

Furthermore, the contest prize money assigned to each tournament contest is divided into six contest parts and paid evenly to each contest part, and the contest prize allocated to each contest part is classified according to the order of the winners of the tournament. Then, the percentage of the contest prize payment based on the ranking of the contest prize winners is determined, and the contest prize money is provided to the contest prize winners based on the ratio.

Of course, when the league contest or tournament contest ends, it goes without saying that the contest prize payout table to be paid to the contest winners will be disclosed on the tournament website.

In addition to this game tournament hosting method, as a way for players to participate in the tournament more freely from advertisements and game clubs, if players in club competition leagues and tournament contests purchase avatars, the avatars will be displayed in the contest game window. It is possible to output to the player information windows 112 and 114 configured therein, and when purchasing a no-advertisement item in the club opposition league and the tournament contest, the advertisement of the video is not output in the contest game window.

In addition, if a player purchases a club move item, the right to move the club of the game can be provided.

Figure 10:
Figure 11:
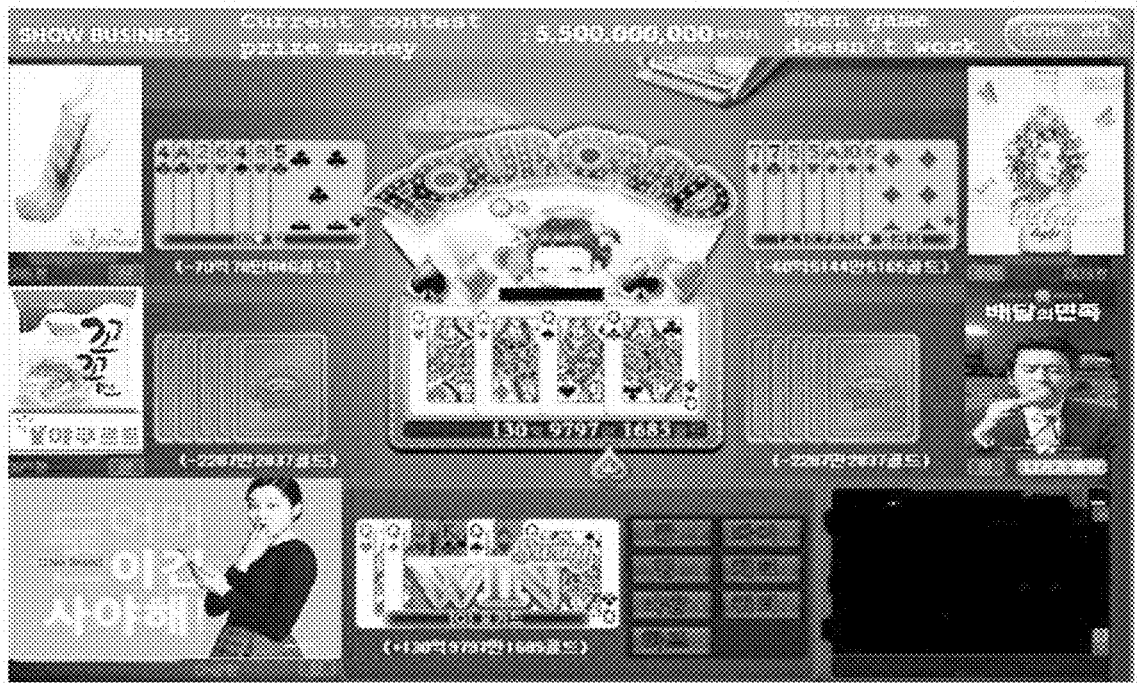
Figure 12:
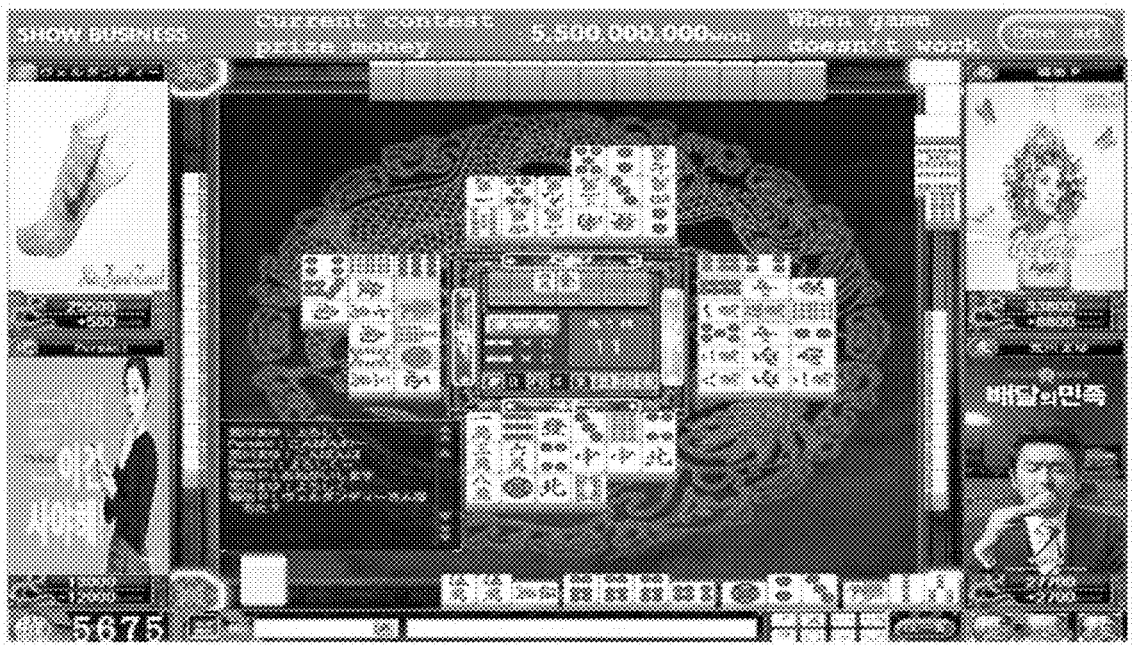

FIG. 10 which is not described is a go-stop contest end screen, FIG. 11 is a poker contest screen, and FIG. 12 is a mahjong contest screen.

What is claimed is:

1. A method for hosting a club-competition web board game contest comprising, the steps of:

(a) joining membership by accessing a web page of a web board game contest hosting server and inputting personal information, by using a user terminal;

(b) joining, a game club in order to play as an affiliated player of a game club of a web board game of which a company is the owner, by using the user terminal;

(c) participating in a league contest hosted by the web board game contest hosting server and playing as a player of the corresponding game club, by using the user terminal;

(d) determining a tournament entrant and a contest prize winner, after the league contest hosted by the web board game contest hosting server is over, and paying the contest prize money to the contest prize winner;

(e) allowing the tournament entrant to participate in a tournament contest hosted by the web board game contest hosting server and to play as a player of the corresponding game club by using the user terminal; and (f) determining contest prize winners, including the final winner, after the tournament contest hosted by the web board game contest hosting server is over, and paying the contest prize money to the contest prize winners, wherein the contest prize money is provided separately for each contest type, and prize money allocated to a corresponding contest type is provided separately to the league contest and the tournament contest, prize money allocated to the league contest is provided separately to a number of game clubs, prize money allocated to the game club is provided separately to a number of contest parts, prize money allocated to a number of contest parts is provided separately to each contest prize winner, prize money allocated to the tournament contest is provided separately to a number of contest parts, and prize money allocated to a contest part is provided separately to each contest prize winner.

2. The method of claim 1, wherein in the steps (c) or (e), the web board game contest hosting server divides and hosts the league contest and the tournament contest into generations and genders and in a number of contest parts.

3. The method of claim 2, wherein in the step (a), the web board game contest hosting server allocates a player to a contest part to participate in, based on personal information input.

4. The method of claim 2, wherein the web board game contest hosting server limits usage time of the player differently for each contest part.

5. The method of claim 1, wherein in the step (b), if the rate at which the user has joined a particular game club exceeds twice the average rate of the entire game club, the web board game contest hosting server blocks joining the particular game club, and when the blocked particular game club reaches an average rate of the entire game club, it is reopened to allow a user to join the particular game club.

6. The method of claim 1, wherein in the step (c), web board game contest hosting server allocates players whose game clubs are different from each other in the same contest game room of a league contest.

7. The method of claim 6, wherein in the step (c), web board game contest hosting server classifies a region based on personal information and designates players from different game clubs and regions to the same contest game room in the league contest.

8. The method of claim 1, wherein in the step (c), the web board game contest hosting server limits the number of times of participation in the web board game tournament to one day.

9. The method of claim 1, wherein in the step (c), when a player in a league contest could not handle a predetermined contest schedule, the web board game contest hosting server adds a number of contest participating times, as much as the number of non-participated times.

10. The method of claim 1, wherein in the step (c), when the player enters a contest game room of the league contest, the web board game contest hosting server gives the same start points to anyone regardless of the previous tournament win or loss or score.

11. The method of claim 1, wherein in the step (c), the web board game contest hosting server automatically proceeds with the league contest regardless of the player if the player exceeds a certain time determined by contest rules.

12. The method of claim 11, wherein the web board game contest hosting server imposes a penalty point to a player who has exceeded a time determined by contest rules.

13. The method of claim 1, wherein in the step (c), the web board game contest hosting server imposes a penalty point to the player when disconnected during the league contest or when the player forfeits before the league contest ends.

14. The method of claim 1, wherein in the step (d), the web board game contest hosting server determines contest prize winners based on the contest ranking, and the contest ranking is determined with priority based on winning points, penalty points, score points, contest usage time, and victory record for each score section.

15. The method of claim 14, wherein the winner of the league contest is given a positive winning point, the loser is given a negative winning point, and the summed-up points are used as a first priority for determining the contest ranking.

16. The method of claim 15, wherein if disconnected, forfeited, or the allotted time is exceeded during the league contest, a penalty point is imposed to the player and summed-up, wherein the summed-up penalty points are used as a second priority for determining the contest ranking.

17. The method of claim 16, wherein points scored or lost by the player in the league contest are summed-up, wherein the summed-up score points are used as a third priority for determining the contest ranking.

18. The method of claim 17, wherein time used in the league contest by the player are summed-up, and the summed-up contest usage time is used as a fourth priority for determining the contest ranking.

19. The method of claim 18, wherein a score point range is divided into several sections for each contest type in the league contest, and the contest records achieved for each section are separately summed-up, wherein the order of the score points in each section is used as a fifth priority for determining the contest ranking.

20. The method of claim 1, wherein in the step (c), the web board game contest hosting server provides a game account in which a contest record is recorded on the user terminal of the player.

21. The method of claim 1, wherein in the step (d), when the league contest ends, the web board game contest hosting server announces the tournament advance list and contest records on the homepage, and notifies that the player has been selected as a tournament entrant by text message and e-mail.

22. The method of claim 1, wherein in the step (d), the web board game contest hosting server determines the number of players entering the tournament by determining the number of people based on the contest ranking for each contest part from the start date to the end date of the league contest.

23. The method of claim 1, wherein in the step (d), the web board game contest hosting server determines the number of players who have advanced to the tournament, and determines the number of people based on the contest ranking for each game club on the end date of the league contest.

24. The method of claim 1, wherein in the step (d), the web board game contest hosting server selects the entire personnel advancing to a tournament contest for each contest in a league contest in multiples according to the league contest participating personnel configuration.

25. The method of claim 1, wherein in the step (e), the web board game contest hosting server determines a contest ranking of a contest participant in a final match of a tournament contest in the order of all-in, and for the rest of the participants, the contest ranking is determined by order of possessed score points when the tournament contest is over.

26. The method of claim 1, wherein in the step (d) or (f), the contest prize is procured from an advertisement revenue generated from an advertisement provided to the user terminal.

27. The method of claim 26, wherein the contest prize money changes in real time according to the sales of the advertisement, and the changed contest prize is disclosed in real time on a ticker bar formed at an upper part of the contest game room.

28. The method of claim 26, wherein in the case of a video advertisement, the advertisement is output to a ticker bar formed at an upper part of the contest game room.

29. The method of claim 28, wherein the advertisement of the video is output when a player clicks an advertisement display icon provided on the ticker bar during the progress of the game.

30. The method of claim 29, wherein the click of the advertisement display icon is limited to once for each player.

31. The method of claim 26, wherein in the case of a display advertisement for a game club, the advertisement is output to an information window of a player affiliated to the game club provided in the contest game window.

32. The method of claim 31, wherein the game club display advertisement is enlarged and output each time the player affiliated to the game club wins.

33. The method of claim 31, wherein the display advertisement of the game club is output to a display pop-up advertisement configured on a league contest or tournament contest homepage or a display pop-up advertisement configured on a game club house web page.

34. The method of claim 1, wherein in the step (c) or (e), the web board game contest hosting server outputs to a player information window provided in the contest game window when a player purchases an avatar.

35. The method of claim 1, wherein in the step (c) or (e), the web board game contest hosting server does not provide an advertisement of a video to the user terminal of the player when the player purchases a no-advertisement item.

36. The method of claim 1, wherein if a player purchases a club move item, the right to move the club of the game is provided.

37. A system for hosting club-competition web board game contest comprising, a web board game contest hosting server, wherein a number of companies become owners of game clubs of web board games, to host web board games as league contests and tournament contest, and a contest game window is provided so that a player affiliated to a game club can connect and play via a user terminal, wherein contest prize money paid to a contest prize winner of the league contest and the tournament contest is procured from an advertisement revenue generated from advertisements provided to a user terminal; and a user terminal connected to the web board game contest hosting server via a wired/wireless network to join membership and join a game club as an affiliated player, participating in the league contest and the tournament contest to play as an affiliate of the corresponding game club, wherein the contest game window consists of a contest game room at a lower part and a ticker bar at an upper part, and in the contest game room, one side has information windows of players as many as the players participating in the contest game, and the ticker bar includes a real-time contest prize money output part that outputs contest prize money in real-time, and a video advertisement output part that outputs a video advertisement and includes an advertisement display icon, wherein the contest prize money is provided separately for each contest type, and prize money allocated to a corresponding contest type is provided separately to the league contest and the tournament contest, prize money allocated to the league contest is provided separately to a number of game clubs, prize money allocated to the game club is provided separately to a number of contest parts, prize money allocated to a number of contest parts is provided separately to each contest prize winner, prize money allocated to the tournament contest is provided separately to a number of contest parts, and prize money allocated to a contest part is provided separately to each contest prize winner.

38. The system of claim 37, wherein the web board game contest hosting server hosts a league contest and a tournament contest in a number of contest parts divided by generation and gender, and a player's usage time is limited differently for each contest part.

39. A system for hosting club-competition web board game contest comprising, a web board game contest hosting server, wherein a number of companies become owners of game clubs of web board games, to host web board games as league contests and tournament contest, and a contest game window is provided so that a player affiliated to a game club can connect and play via a user terminal, wherein contest prize money paid to a contest prize winner of the league contest and the tournament contest is procured from an advertisement revenue generated from advertisements provided to a user terminal; and a user terminal connected to the web board game contest hosting server via a wired/wireless network to join membership and join a game club as an affiliated player, participating in the league contest and the tournament contest to play as an affiliate of the corresponding game club, wherein the web board game contest hosting server determines the contest prize winners based on the contest ranking, but the contest ranking is determined with priority in the order of winning points, penalty points, score points, contest usage time, and the number of victory records for each score section, wherein the contest prize money is provided separately for each contest type, and prize money allocated to a corresponding contest type is provided separately to the league contest and the tournament contest, prize money allocated to the league contest is provided separately to a number of game clubs, prize money allocated to the game club is provided separately to a number of contest parts, prize money allocated to a number of contest parts is provided separately to each contest prize winner, prize money allocated to the tournament contest is provided separately to a number of contest parts, and prize money allocated to a contest part is provided separately to each contest prize winner.

\* \* \* \* \*